United States Patent
Vinati et al.

(10) Patent No.: US 7,162,734 B2
(45) Date of Patent: Jan. 9, 2007

(54) METHOD FOR CONTROLLING ACCESS TO A DATA COMMUNICATION NETWORK, WITH USER IDENTIFICATION

(75) Inventors: Samuele Vinati, Brescia (IT); Felice Vinati, Villa Carcina (IT); Ivan Berardinelli, Tignale (IT)

(73) Assignee: Gestweb S.p.A. (IT)

( * ) Notice: Subject to any disclaimer, the term of this patent is extended or adjusted under 35 U.S.C. 154(b) by 811 days.

(21) Appl. No.: 09/880,147

(22) Filed: Jun. 14, 2001

(65) Prior Publication Data

US 2002/0056049 A1 May 9, 2002

(30) Foreign Application Priority Data

Nov. 6, 2000 (IT) .......................... MI2000A2390

(51) Int. Cl.
 *H04L 9/32* (2006.01)
(52) U.S. Cl. ..................... 726/2; 726/3; 726/4; 726/21
(58) Field of Classification Search ........ 713/200–202, 713/176, 179, 156, 161, 175, 182; 707/9; 709/225, 200, 203, 217–219, 229; 705/14; 726/1–5, 16–19, 27–29
See application file for complete search history.

(56) References Cited

U.S. PATENT DOCUMENTS

| | | | | |
|---|---|---|---|---|
| 5,826,266 | A * | 10/1998 | Honda | 707/9 |
| 5,835,722 | A | 11/1998 | Bradshaw et al. | 395/200.55 |
| 5,987,611 | A | 11/1999 | Freund | 713/201 |
| 5,996,011 | A | 11/1999 | Humes | 709/225 |
| 6,134,592 | A | 10/2000 | Montulli | 709/229 |
| 6,216,228 | B1 * | 4/2001 | Chapman et al. | 713/176 |
| 6,256,739 | B1 * | 7/2001 | Skopp et al. | 713/201 |
| 6,279,112 | B1 * | 8/2001 | O'Toole et al. | 713/201 |
| 6,608,814 | B1 * | 8/2003 | Libman et al. | 370/230 |
| 6,704,787 | B1 * | 3/2004 | Umbreit | 709/229 |

FOREIGN PATENT DOCUMENTS

| | | |
|---|---|---|
| EP | 0 810 766 A2 | 12/1997 |
| EP | 0 986 229 A2 | 3/2000 |
| EP | 1 020 804 A2 | 7/2000 |
| EP | 1 045 318 A1 | 10/2000 |
| EP | 1 098 493 A1 | 5/2001 |
| JP | 11-306113 | 11/1999 |
| WO | WO 97/49252 A2 | 12/1997 |

(Continued)

OTHER PUBLICATIONS

Samar, Vipin, "Single Sign-On Using Cookies For Web Applications", (1999), IEEE, Oracle Corporation, pp. 158-163.

*Primary Examiner*—Hosuk Song
(74) *Attorney, Agent, or Firm*—Obstrolenk, Faber, Gerb & Soffen, LLP

(57) ABSTRACT

A method for controlling access to a data communication network, comprising the steps of:
 upon connection of a user to a data communication network, making available on the network an age identifier which is suitable to define the age of the user who wishes to make the connection;
 entering, on the part of the user, the address of a site of interest which the user intends to visit, the address being automatically associated with the age identifier made available on the network; and
 allowing the user to perform the network connection on the basis of the reading of the age identifier associated with the address keyed in by the user, and steering accordingly the network navigation of the user.

6 Claims, 2 Drawing Sheets

FOREIGN PATENT DOCUMENTS

| | | |
|---|---|---|
| WO | 00 29969 | 5/2000 |
| WO | WO 00/51035 A1 | 8/2000 |
| WO | WO 01/63835 A1 | 8/2001 |
| WO | WO 01/88672 A2 | 11/2001 |
| WO | 01 98934 | 12/2001 |

* cited by examiner

METHOD FOR CONTROLLING ACCESS TO A DATA COMMUNICATION NETWORK, WITH USER IDENTIFICATION

BACKGROUND OF THE INVENTION

The present invention relates to a method for controlling access to a data communication network, with user identification. More particularly, the invention relates to a method for controlling access to the Internet.

As is known, the increasing growth of data networks, such as for example the Internet, has led a very large number of users to go online every day.

On the other hand, the increasing growth of the data communication network has caused information of various kinds to be placed on the network, with a consequent proliferation of sites containing data and information, as well as images, videos and the like, whose viewing should be reserved exclusively to adult users.

However, it is evident that the simplicity of access to a data communication network such as the Internet allows anyone, and especially minors, who usually have considerable time available, to access the network without any restriction, being able to navigate it and key in substantially any kind of site without their minor age being protected by banning the viewing of sites whose content is unsuitable for minors.

Furthermore, the parents of minors cannot be aware of the sites visited by the children and therefore are practically unable to perform any kind of control.

SUMMARY OF THE INVENTION

The aim of the present invention is to provide a method for controlling access to a data communication network which allows to distinguish between network access requested by a minor user and access requested by an adult user, thus steering navigation on the network according to the user's profile.

Within this aim, an object of the present invention is to provide a method for controlling access to a data communication network which allows, in the case of a minor user, to perform a controlled navigation, therefore blocking sites which cannot be viewed by minors.

Another object of the present invention is to provide a method for controlling access to a data communication network which allows to send a user age identifier directly from the user's computer.

Another object of the present invention is to provide a method for controlling access to a communication network which allows to decode the age identifier sent by the user in order to steer the user's navigation.

Another object of the present invention is to provide a method for controlling access to a communication network which is highly reliable, relatively simple to provide, and at competitive costs.

This aim and these and other objects which will become better apparent hereinafter are achieved by a method for controlling access to a data communication network, characterized in that it comprises the steps of:

upon connection of a user to a data communication network, making available on the network an age identifier which is suitable to define the age of said user who wishes to make the connection;

entering, on the part of said user, an address of a site of interest which the user intends to visit, said address being automatically associated with said age identifier made available on the network; and allowing said user to perform the network connection on the basis of the reading of said age identifier associated with said address keyed in by said user, and steering accordingly the network navigation of said user.

BRIEF DESCRIPTION OF THE DRAWINGS

Further characteristics and advantages of the invention will become better apparent from the description of a preferred but not exclusive embodiment of the method according to the invention, illustrated only by way of non-limitative example in the accompanying drawings, wherein.

DESCRIPTION OF THE PREFERRED EMBODIMENTS

Figure 1:
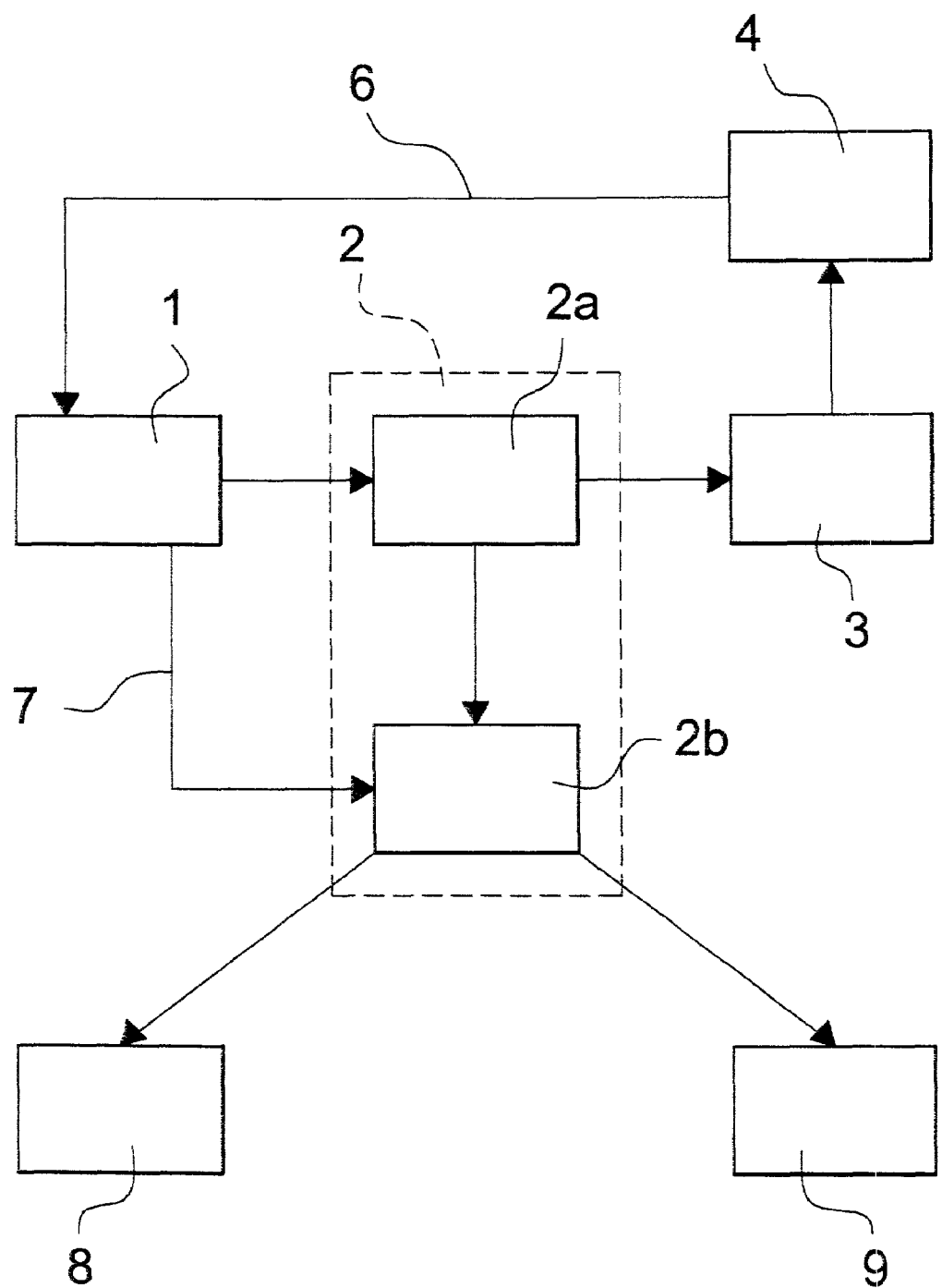
FIG. 1 is a block diagram of the method for the connection of a user to a data communication network, according to a first embodiment of the present invention.

With reference to the figures, the method according to the invention, according to a first embodiment, is as follows.

The user, generically designated by the reference numeral 1, upon requesting connection to a data communication network by dialing; through his computer, the telephone number of a service provider 2 with which he has previously drawn up an appropriate contract for the service, is identified by being asked a password and a user identification word.

The identification step is generally designated by the reference numeral 3.

At this point, the identification procedure verifies, by accessing a database 4, the information received from the connected user or the service provider 2 and identifies the user's profile.

The database 4 then returns to the computer of the user 1 an identifier 6 which allows to unequivocally identify the age of the user. This identifier is then associated, by linking it in any manner, with the address that the user 1 keys in in order to access a given site of the data network.

Accordingly, the address 7 that the user sends to address reading means 2b of the server 2 contains the age identifier 6 associated therewith.

In FIG. 1, the reference numeral 2a designates means for receiving the connection request to the network by the user 1.

The address reading means 2b are suitable to decode the address 7 sent by the user 1, with which the user's age identifier 6 is associated.

By thus performing an age-based discrimination, the address reading means 2b allow to perform unrestricted navigation 8, if the user is an adult, or a controlled navigation 9, if the user is instead a minor.

The user is therefore able to send directly from his computer an address 7 with which an age identifier 6 is associated, and said transmission on the part of the user can be performed for example by a conventional browser after receiving from the database 4 the age identifier 6.

In practice, therefore, if the user 1 is recognized as a minor, navigation is controlled and the list of sites requested by the user who is navigating is sent, for example via e-mail, to the parents of the minor user.

The controlled navigation procedure entails that all sites that can be identified as accessible by a minor have an identification code and that likewise all the sites that cannot be accessed by a minor are identified by a different identification code.

Figure 2:
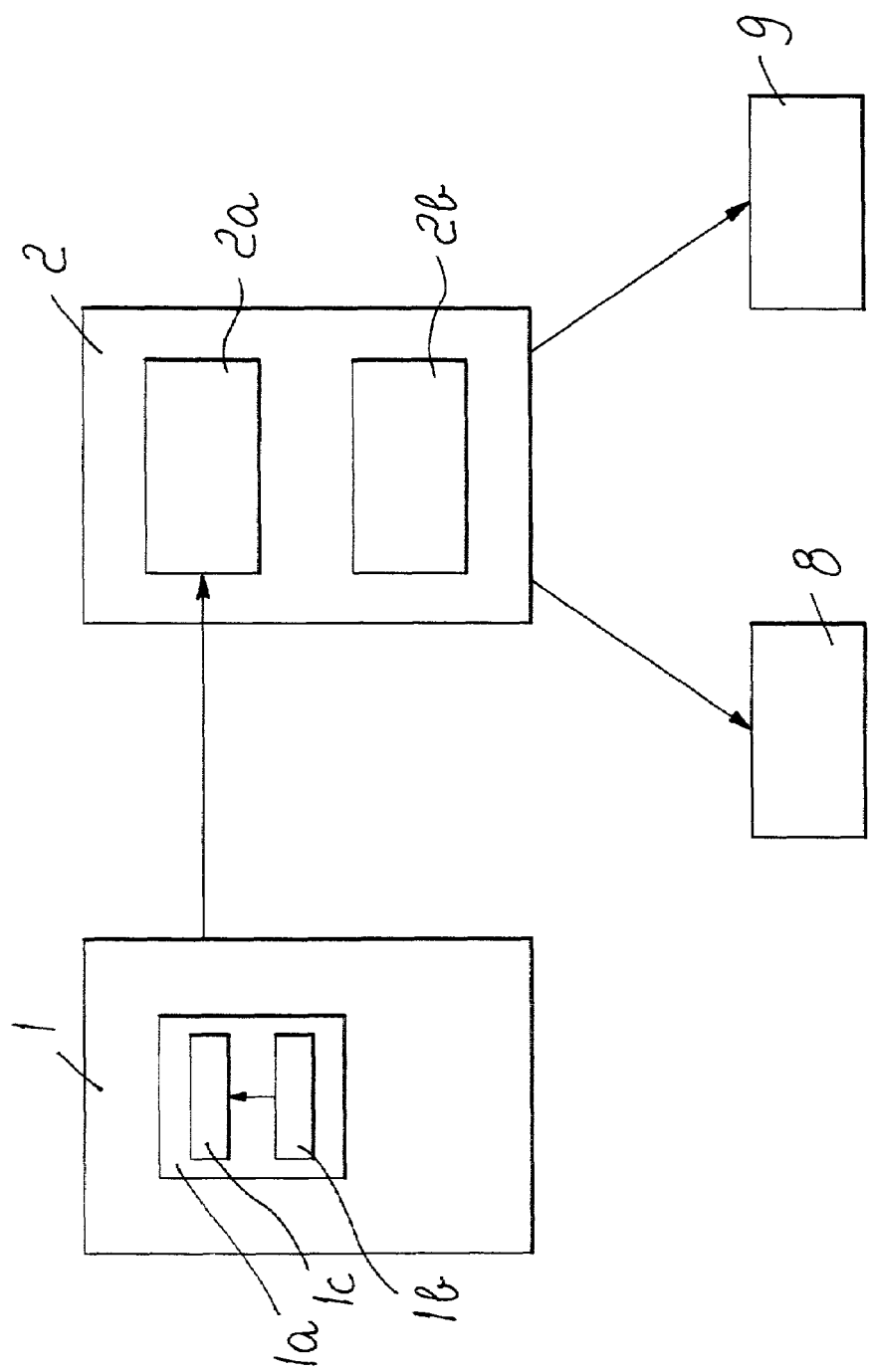
FIG. 2 is a block diagram of a second embodiment of the method according to the present invention.

FIG. 2, in which the reference numerals that are identical to the ones used in FIG. 1 designate identical elements, is a block diagram of a second embodiment of the method according to the present invention.

In this second embodiment, the age identifier that is meant to be associated with an address that the user keys in in order to communicate to the server 2 that he wants to navigate to a given site is automatically associated with the address that the user keys in by the program that the user uses for navigating the network.

Essentially, the user 1 uses a program 1a, commonly known as "browser", which allows the user to navigate the data communication network, and the program 1a automatically associates an age identifier, designated in this case by the reference numeral 1b, with the address designated by 1c that the user keys in in order to communicate to the server 2 that he intends to navigate to a given site.

The age identifier 1b that is automatically associated by the program 1a must be entered in the program 1a by a parent or the like who performs his initial registration in order to initialize the program.

Any subsequent attempt to modify the age identifier 1b on the part of unauthorized people is barred by using a password that must be known only to the person authorized to perform this modification.

The method according to the second embodiment is then similar to the one described for the first embodiment, since once the address 1c, with the age identifier 1b associated therewith, is sent to the server 2, the latter processes the data like preceding one.

In practice it has been found that the method according to the invention allows to verify the identity of the user who connects to the data communication network, sending directly online to the user an age identifier which is determined by looking up a database in which the user's profile is recorded, said age identifier being associated with an address that the user keys in in order to visit a site he is interested in.

The method thus conceived is susceptible of numerous modifications and variations, all of which are within the scope of the same inventive concept; all the details may furthermore be replaced with other technically equivalent elements.

The disclosures in Italian Patent Application No. MI2000A002390 from which this application claims priority are incorporated herein by reference.

What is claimed is:

1. A method for controlling a user's access to a computer network, the method comprising:
   establishing by a service provider a connection to a data communication network for said user;
   providing over said network a user age identifier which is suitable to define said user's age, wherein said step of providing said user age identifier includes transmitting to at least one of a site, said service provider and said user, age information related to said age identifier;
   receiving by said user a network address of a site to which the user intends to connect;
   automatically associating said network address with said age identifier; and
   allowing said user to connect to said site as a function of said age identifier.

2. The method according to claim 1, wherein said step of providing over said network said user age identifier includes verifying data regarding said user and comparing said data with a database which contains profiles of users registered with a service provider suitable to provide said connection.

3. The method according to claim 1, wherein the step of providing over said network a user age identifier further comprises receiving from said user said age identifier in a network navigation program used by said user to connect to said data communication network.

4. The method according to claim 1, wherein said step of allowing said user to connect to said site includes unrestricted network navigation when said age identifier reveals said user is an adult user.

5. The method according to claim 1, wherein said age identifier is associated with said site keyed in by said user directly by a network navigation program used by said user.

6. The method according to claim 1, wherein said step of allowing said user to connect to said site includes controlling network navigation if said age identifier reveals said user is a minor.

* * * * *